Nov. 26, 1929.　　　W. F. IRRGANG　　　1,737,157
BAND TURNING DEVICE
Filed July 8, 1926
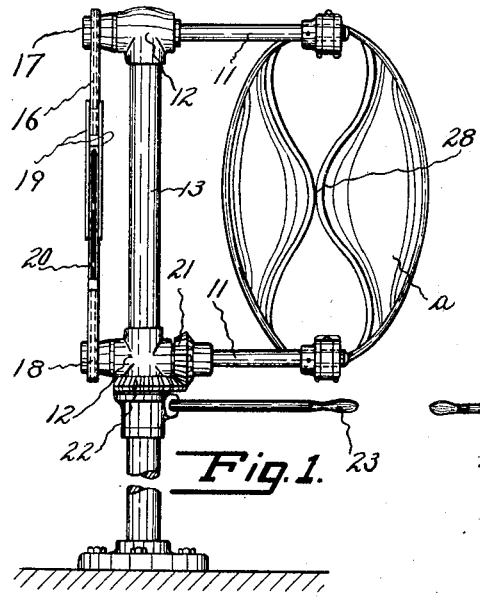
Fig. 1.
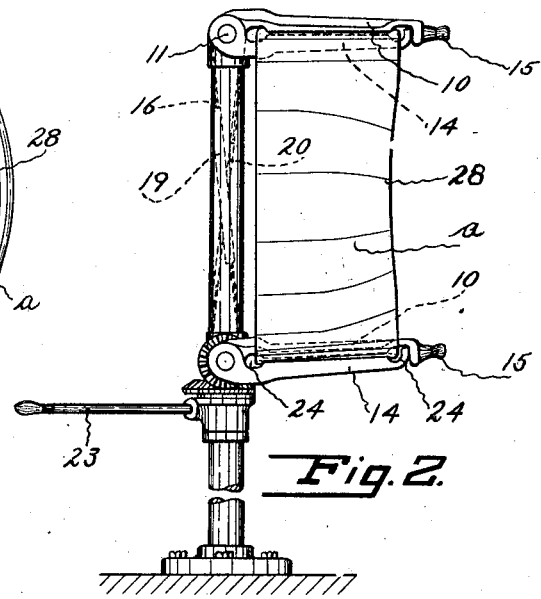
Fig. 2.
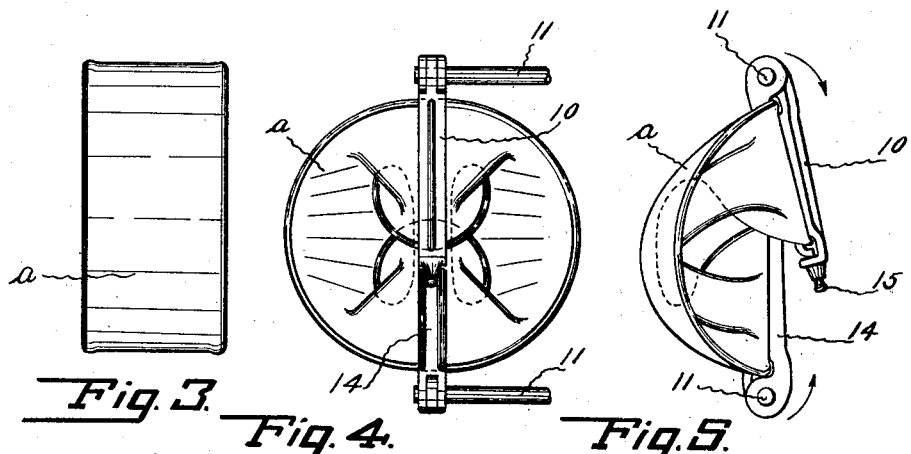
Fig. 3.　　Fig. 4.　　Fig. 5.
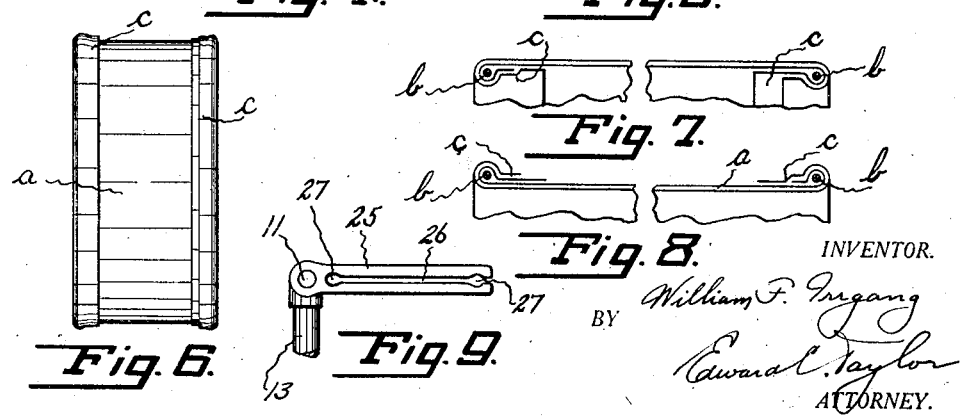
Fig. 6.　　Fig. 7.
Fig. 8.
Fig. 9.
INVENTOR.
William F. Irrgang
BY
Edward C. Taylor
ATTORNEY.

Patented Nov. 26, 1929

1,737,157

UNITED STATES PATENT OFFICE

WILLIAM F. IRREGANG, OF CHICOPEE, MASSACHUSETTS, ASSIGNOR TO THE FISK RUBBER COMPANY, OF CHICOPEE FALLS, MASSACHUSETTS, A CORPORATION OF MASSACHUSETTS

BAND-TURNING DEVICE

Application filed July 8, 1926. Serial No. 121,250.

This invention relates to a method and an apparatus for inverting flat bands, usually having beaded edges, in the manufacture of tire casings. The flat bands which may be operated upon are either partial tire carcasses having less than the desired number of plies of material, or may be completely built up tire casings such as, for example, clincher tires which are completely built up face-down upon a drum and then inverted. My invention has for its object to perform this inverting step with rapidity and to straighten out with sufficient accuracy for subsequent operations such wrinkles or folds as may tend to form during inversion.

Referring to the drawings,

Fig. 1 is a front elevation of a machine constructed in accordance with my invention, showing a beaded edged band forming a part of the tire carcass mounted in place;

Fig. 2 is a side elevation of the same;

Fig. 3 is a side elevation of a tire band before being placed in the inverting machine;

Fig. 4 is a view similar to Fig. 1 but showing the operation substantially half-way completed;

Fig. 5 is a view corresponding to Fig. 2 showing the same stage of operation as Fig. 4;

Fig. 6 is a view similar to Fig. 3 showing the inverted band;

Fig. 7 is a diagrammatic section through the upper edge portion of Fig. 3;

Fig. 8 is a similar section through the upper edge portion of Fig. 6; and

Fig. 9 is a detail of a modification.

In practicing my method I prefer to employ a machine such as is illustrated in Figs. 1 and 2. This machine comprises arms 10 freely rotatable around shafts 11 parallel to but spaced from each other and rotatable in journals 12 upon a pedestal 13. Mounted so as to straddle arms 10 where the latter have their bearing upon the shafts are arms 14, fixed to the shafts for rotation therewith. The arms 14 and the arms 10 normally lie parallel to each other, forming a holding and gripping means for opposed portions of the carcass band a. During the operation of the mechanism in inverting the band the two arms are held together by spring detents 15, or any other suitable device which will permit the arms being separated when desired, to permit the removal of the inverted band.

The arms are driven simultaneously in opposite directions by a chain 16 passing around sprockets 17 and 18 on the shafts. In order to give the opposite rotation the chain is crossed, and to avoid friction one section of the chain is replaced with links 19 and another with a rod 20 passing between the links. This construction avoids the difficulties incident to cross chains and is made possible by the small amount of travel necessary in the present case. Driving power is supplied to the arms by gears 21 and 22 fastened to the shaft and rotatably mounted upon the pedestal respectively. A handle 23 is secured to the latter gear for actuation by the operator. Preferably the arms are formed so as to present enlargements 24 in which the beaded edges of the carcass band are received.

This mechanism serves to hold the bands transversely extended at portions diametrically opposite each other. Rotation of the shafts causes the edge of the casing shown at the right in Fig. 2 to be rotated about the edges shown at the left. As indicated in Fig. 2, the lower one of the arms 14 is mounted slightly out of parallelism with the upper one of these arms, and therefore, as is best shown in Fig. 5, makes its travel slightly ahead of the other arm. This avoids contact of the parts during operation and permits a spacing of the shafts 11 closer together than the sum of the lengths of the two arms. The rotation of the edge portions of the band are preferably carried on at a considerable speed so that, as the band is inverted, it will straighten out with a snap or jerk which will free it of wrinkles.

The bands have been shown for clearness of illustration as having wires b at their edges, around which the material of the band is folded as at c. If it is desired to build clincher tires, I have found that an arm 25, such as is indicated in Fig. 9, is suitable. This arm has a central slot 26 provided with enlarged portions 27 into which the beads of the clincher tires are held. In the inversion of clincher tire bands the beads do not need to be held as firmly as in the inversion of bands having wire beads. For this reason it is possible to mount the turning device in a position such as would result if the device shown in Fig. 2 were turned over ninety degrees to the left and the base of the standard fastened to a wall at the right. With the device mounted in this position and with the open-ended arms shown in Fig. 9, the bands may easily be positioned in the upwardly opening slots 26, and will fall out of themselves when inversion has been completed.

In carcass bands having wire beads it is desirable to bend together opposite sides of one of the wires as indicated at 28 in Figs. 1 and 2. This gives the bead the necessary start so that it will carry through the inversion without difficulty. A clincher tire bead, however, being flexible does not require this assistance.

Having thus described my invention, I claim:

1. A band inverting device for use in the manufacture of tire casings having grasping devices positioned to hold the band at diametrically opposite points, said devices being constrained for movement in eccentric paths and in opposing directions.

2. A band inverting device for use in the manufacture of tire casings which comprises a pair of band holding arms rotatable around spaced parallel axes, and means for rotating the arms about their respective axes in opposite directions and with one arm slightly in the lead of the other.

3. A method of inverting bands having beaded edges in the manufacture of tire casings which comprises holding portions of the band flat and transversely extended, and rotating one edge of each of said portions inwardly about the other while the portions are so held.

4. A method of inverting bands having beaded edges in the manufacture of tire casings which comprises holding the band flat and transversely extended at diametrically opposite portions, and quickly rotating one edge of each of said portions inwardly about the other while the portions are so held, the speed of rotation being sufficient to snap the folds out of the band upon inversion.

5. A band inverting device for use in the manufacture of tire casings which comprises a plurality of band holding arms mounted for rotation around spaced axes, said holding arms being formed to position one edge of the held band closely adjacent said axes.

6. A band inverting device for use in the manufacture of tire casings which comprises means for grasping each bead edge of the band at spaced points and means for moving the grasping means to turn opposite sides of the band inside out about one edge of the band.

WILLIAM F. IRRGANG.